United States Patent
Zhang (10) Patent No.: US 12,150,175 B2
(45) Date of Patent: Nov. 19, 2024

(54) METHOD AND DEVICE FOR DETERMINING TIME SLOT FOR MONITORING OCCASION, TERMINAL, AND STORAGE MEDIUM

(71) Applicant: GUANGDONG OPPO MOBILE TELECOMMUNICATIONS CORP., LTD., Guangdong (CN)

(72) Inventor: Zhi Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 394 days.

(21) Appl. No.: 17/660,689

(22) Filed: Apr. 26, 2022

(65) Prior Publication Data

US 2022/0256604 A1 Aug. 11, 2022

Related U.S. Application Data (63) Continuation of application No. PCT/CN2019/116847, filed on Nov. 8, 2019.

(51) Int. Cl.
*H04W 74/0816* (2024.01)
*H04L 5/00* (2006.01)
*H04L 27/26* (2006.01)
*H04W 56/00* (2009.01)
*H04W 72/0446* (2023.01)
*H04W 74/08* (2024.01)

(52) U.S. Cl.
CPC ....... *H04W 74/0816* (2013.01); *H04L 5/0051* (2013.01); *H04L 27/26025* (2021.01); *H04W 56/001* (2013.01); *H04W 72/0446* (2013.01); *H04W 74/0866* (2013.01)

(58) Field of Classification Search
CPC .......... H04W 74/0816; H04W 56/001; H04W 72/0446; H04W 74/0866; H04L 27/26025
See application file for complete search history.

(56) References Cited

U.S. PATENT DOCUMENTS

| | | | |
|---|---|---|---|
| 2019/0191457 A1 | 6/2019 | Si et al. | |
| 2022/0174624 A1* | 6/2022 | Wu | ........................ H04L 5/0094 |
| 2022/0240231 A1* | 7/2022 | He | ........................ H04L 5/0023 |

FOREIGN PATENT DOCUMENTS

CN 110351835 A 10/2019

OTHER PUBLICATIONS

Extended European Search Report for European Application No. 19951380.5 issued Oct. 17, 2022. 7 pages.
Nokia et al. "Initial Access Signals and Channels for NR-U" R1-1900347; 3GPP TSG RAN WG1 Meeting #AH-1901; Taipei, Taiwan; Jan. 21-25, 2019. 24 pages.

(Continued)

*Primary Examiner* — Won Tae C Kim
(74) *Attorney, Agent, or Firm* — PERKINS COIE LLP (57) ABSTRACT

Implementations of the present application disclose a method and device for determining a time slot for a monitoring occasion, a terminal, and a storage medium. The method includes: a terminal determining a time slot for a Type0-PDCCH monitoring occasion according to SCS, a DRS window length, and an indication value of a QCL relationship between different SSB indexes.

18 Claims, 3 Drawing Sheets

(56) References Cited

OTHER PUBLICATIONS

Vivo "Discussion on initial access procedure for NR-U" R1-1910205; 3GPP TSG RAN WG1 #98bis; Chongqing, China; Oct. 14-20, 2019. 8 pages.
3GPP TSG RAN meeting #84—RP-191360—Newport Beach, USA, Jun. 3-6, 2019—Status report for WI NR-based access to unlicensed spectrum (17 pages).
3GPP TSG RAN WG1 Meeting #96bis—R1-1904192—Xi'an, China, Apr. 8-12, 2019—Nokia, Nokia Shanghai Bell, Initial Access Signals and Channels for NR-U (20 pages).
International Search Report issued May 21, 2020 of PCT/CN2019/116847 (4 pages).

* cited by examiner

METHOD AND DEVICE FOR DETERMINING TIME SLOT FOR MONITORING OCCASION, TERMINAL, AND STORAGE MEDIUM

CROSS-REFERENCE TO RELATED APPLICATION

The present application is a continuation application of International PCT Application No. PCT/CN2019/116847, filed on Nov. 8, 2019, the entire content of which is hereby incorporated by reference.

TECHNICAL FIELD

The present disclosure relates to communication technologies, in particular to a method and apparatus for determining a slot of a detection opportunity, a terminal, and a storage medium.

BACKGROUND

When using an unlicensed spectrum, a terminal adopts a Listen Before Talk (LBT) mechanism to ensure to share unlicensed spectrum resources with other terminals effectively, that is, the terminal can only send a signal when it detects that a channel on the unlicensed spectrum is idle.

In related technologies of New Radio (NR) of the 5th Generation (5G) mobile communication, in unlicensed spectrum bands, a terminal detects a Type0-Physical Downlink Control Channel (Type0-PDCCH) too many times, which increases energy consumption of the terminal.

SUMMARY

In order to solve related technical problems, implementations of the present disclosure provide a method and apparatus for determining a slot of a detection opportunity, a terminal, and a storage medium.

An implementation of the present disclosure provides a method for determining a slot of a detection opportunity, including: determining, by a terminal, a slot of a detection opportunity of a Type0-Physical Downlink Control Channel (Type0-PDCCH) according to a Sub-Carrier Space (SCS), a window length of a Discovery Reference Signal (DRS), and an indication value of a Quasi-Co-Location (QCL) relationship between different Synchronization Signal Block/Physical Broadcast Channel (PBCH) block indexes.

In the above solution, the determining, by the terminal, the slot of the detection opportunity of the Type0-PDCCH according to the SCS, the window length of the DRS, and the indication value of the QCL relationship between different SSB indexes, includes: determining, by the terminal, whether a first condition is met to obtain a determination result; wherein the first condition is that a quantity of SSB candidate positions within a DRS window is less than the indication value; the quantity of SSB candidate positions within the DRS window is determined based on the SCS and the window length; determining, by the terminal, the slot of the detection opportunity of the Type0-PDCCH based on the determination result and a first SSB index; wherein, the first SSB index is an SSB index detected by the terminal.

In the above solution, the determining, by the terminal, the slot of the detection opportunity of the Type0-PDCCH based on the determination result and the first SSB index, includes: using, by the terminal, two consecutive slots from a slot corresponding to the first SSB index as slots of detection opportunities of the Type0-PDCCH in a case that the determination result is that the first condition is met; or, determining, by the terminal, at least one second SSB index having a QCL relationship with the first SSB index and determining the slot of the detection opportunity of the Type0-PDCCH according to the first SSB index and the at least one second SSB index in a case that the determination result is that the first condition is not met.

In the above solution, the determining the slot of the detection opportunity of the Type0-PDCCH according to the first SSB index and the at least one second SSB index, includes: using, by the terminal, two consecutive slots from a slot corresponding to the first SSB index and two consecutive slots from a slot corresponding to each second SSB index in the at least one second SSB index as slots of detection opportunities of the Type0-PDCCH.

In the above solution, the determining the slot of the detection opportunity of the Type0-PDCCH according to the first SSB index and the at least one second SSB index, includes: using, by the terminal, a slot corresponding to the first SSB index and a slot corresponding to each second SSB index in the at least one second SSB index as slots of detection opportunities of the Type0-PDCCH.

In the above solution, the determining the slot of the detection opportunity of the Type0-PDCCH according to the first SSB index and the at least one second SSB index, includes: determining, by the terminal, at least one third SSB index in the at least one second SSB index; wherein an SSB candidate position corresponding to the third SSB index is located within Channel Occupancy Time (COT); the COT is COT established by a base station; using, by the terminal, two consecutive slots from a slot corresponding to the first SSB index and two consecutive slots from a slot corresponding to each third SSB index in the at least one third SSB index as slots of detection opportunities of the Type0-PDCCH.

In the above solution, the determining the slot of the detection opportunity of the Type0-PDCCH according to the first SSB index and the at least one second SSB index, includes: determining, by the terminal, at least one third SSB index in the at least one second SSB index; wherein an SSB candidate position corresponding to the third SSB index is located within Channel Occupancy Time (COT); the COT is COT established by a base station; using, by the terminal, a slot corresponding to the first SSB index and a slot corresponding to each third SSB index in the at least one third SSB index as slots of detection opportunities of the Type0-PDCCH.

In the above solution, the method further includes: acquiring, by the terminal, a first indication, wherein the window length is indicated in the first indication; or, determining, by the terminal, the window length to be a first default value in a case that the first indication is not acquired.

In the above solution, the method further includes: acquiring, by the terminal, a second indication, wherein the indication value is indicated in the second indication; or, determining, by the terminal, the indication value to be a second default value in a case that the second indication is not acquired.

In the above solution, the method further includes: acquiring, by the terminal, a third indication, wherein the COT is indicated in the third indication; or, determining, by the terminal, the COT to be a third default value in a case that the third indication is not acquired.

In the above solution, the third default value is a value greater than the window length in a case that the terminal does not acquire the third indication.

In the above solution, the method further includes: acquiring, by the terminal, a fourth indication, wherein the SCS is indicated in the fourth indication; or, determining, by the terminal, the SCS to be a fourth default value in a case that the fourth indication is not acquired.

In the above solution, a value of the window length includes any one of following: 1 ms; 2 ms; 3 ms; 4 ms; and 5 ms.

In the above solution, a value of the indication value includes any one of following: 1; 2; 4; and 8.

An implementation of the present disclosure further provides an apparatus for determining a slot of a detection opportunity, including: a determination unit, configured to determine a slot of a detection opportunity of a Type0-Physical Downlink Control Channel (Type0-PDCCH) according to a Sub-Carrier Space (SCS), a window length of a Discovery Reference Signal (DRS), and an indication value of a Quasi Co-Location (QCL) relationship between different Synchronization Signal block (SSB) indexes.

In the above solution, the determination unit is configured to: determine whether a first condition is met to obtain a determination result, wherein the first condition is that a quantity of SSB candidate positions within a DRS window is less than the indication value, the quantity of SSB candidate positions within the DRS window is determined based on the SCS and the window length; determine a slot of a detection opportunity of a Type0-PDCCH based on the determination result and a first SSB index, wherein, the first SSB index is an SSB index detected by the terminal.

In the above solution, when determining the slot of the detection opportunity of the Type0-PDCCH based on the determination result and the first SSB index, the determination unit is configured to: use two consecutive slots from a slot corresponding to the first SSB index as slots of detection opportunities of the Type0-PDCCH in a case that the determination result is that the first condition is met; or, determine at least one second SSB index having a QCL relationship with the first SSB index and determine the slot of the detection opportunity of the Type0-PDCCH according to the first SSB index and the at least one second SSB index in a case that the determination result is that the first condition is not met.

In the above solution, when determining the slot of the detection opportunity of the Type0-PDCCH according to the first SSB index and the at least one second SSB index, the determination unit is configured to: use two consecutive slots from a slot corresponding to the first SSB index and two consecutive slots from a slot corresponding to each second SSB index in the at least one second SSB index as slots of detection opportunities of the Type0-PDCCH. In the above solution, when determining the slot of the detection opportunity of the Type0-PDCCH according to the first SSB index and the at least one second SSB index, the determination unit is configured to: use a slot corresponding to the first SSB index and a slot corresponding to each second SSB index in the at least one second SSB index as slots of detection opportunities of the Type0-PDCCH.

In the above solution, when the determination unit determines the slot of the detection opportunity of the Type0-PDCCH according to the first SSB index and the at least one second SSB index, the determination unit is configured to: determine at least one third SSB index in the at least one second SSB index, wherein an SSB candidate position corresponding to the third SSB index is located within Channel Occupancy Time (COT), wherein the COT is COT established by a base station; use two consecutive slots from a slot corresponding to the first SSB index and two consecutive slots from a slot corresponding to each third SSB index in the at least one third SSB index as slots of detection opportunities of the Type0-PDCCH.

In the above solution, when determining the slot of the detection opportunity of the Type0-PDCCH according to the first SSB index and the at least one second SSB index, the determination unit is configured to: determine at least one third SSB index in the at least one second SSB index, wherein an SSB candidate position corresponding to the third SSB index is located within Channel Occupancy Time (COT), the COT is COT established by a base station; use a slot corresponding to the first SSB index and a slot corresponding to each third SSB index in the at least one third SSB index as slots of detection opportunities of the Type0-PDCCH.

In the above solution, the apparatus further includes: a first acquisition unit configured to acquire a first indication; wherein the window length is indicated in the first indication; or, the apparatus further includes: a first default value determination unit configured to determine the window length to be a first default value in a case that the first indication is not acquired.

In the above solution, the apparatus further includes: a second acquisition unit configured to acquire a second indication, wherein the indication value is indicated in the second indication; or, the apparatus further includes: a second default value determination unit configured to determine the indication value to be a second default value in a case that the second indication is not acquired.

In the above solution, the apparatus further includes: a third acquisition unit configured to acquire a third indication, wherein the COT is indicated in the third indication; or, the apparatus further includes: a third default value determination unit configured to determine the COT to be a third default value in a case that the third indication is not acquired.

In the above solution, the third default value is a value greater than the window length in a case that the third indication is not acquired.

In the above solution, the apparatus further includes: a fourth acquisition unit configured to acquire a fourth indication, wherein the SCS is indicated in the fourth indication; or, the apparatus further includes: a fourth default value determination unit configured to determine the SCS to be a fourth default value in a case that the fourth indication is not acquired.

In the above solution, a value of the window length includes any one of following: 1 ms; 2 ms; 3 ms; 4 ms; and 5 ms.

In the above solution, a value of the indication value includes any one of following: 1; 2; 4; and 8.

An implementation of the present disclosure further provides a terminal, which includes a first processor; wherein, the first processor is configured to determine a slot of a detection opportunity of a Type0-Physical Downlink Control Channel (Type0-PDCCH) according to a Sub-Carrier Space (SCS), a window length of a Discovery Reference Signal (DRS), and an indication value of a Quasi Co-Location (QCL) relationship between different Synchronization Signal block (SSB) indexes.

An implementation of the present disclosure further provides a terminal, which includes a first processor and a first memory configured to store a computer program that is runnable on a processor, wherein, the first processor is configured to, when the computer program is running, perform acts of any of the aforementioned methods for determining a slot of a detection opportunity.

An implementation of the present disclosure further provides a storage medium having stored a computer program thereon, when the computer program is executed by a processor, acts of any of the aforementioned methods for determining a slot of a detection opportunity are implemented.

According to the method and apparatus for determining a slot of a detection opportunity, the terminal, and the storage medium provided by the implementations of the present disclosure, the terminal determines the slot of the detection opportunity of a Type0-PDCCH according to an SCS, a window length of a DRS, and an indication value of a QCL relationship between different SSB indexes, so that a quantity of times for detecting the Type0-PDCCH by the terminal can be effectively reduced, and energy consumption of the terminal can be effectively reduced.

DETAILED DESCRIPTION

The present disclosure will be further described in details with reference to drawings and implementations.

An unlicensed spectrum is a shared spectrum. As long as relevant regulations of a country or region on the unlicensed spectrum are met, communication devices in different communication systems may use the unlicensed spectrum without applying for authorization from a government. In order to make the communication devices using the unlicensed spectrum coexist in a friendly way on the unlicensed spectrum, an LBT mechanism is adopted among the communication devices, that is, before a communication device sends a signal on a channel of the unlicensed spectrum, the communication device first performs channel listening, the communication device can send a signal on a corresponding channel only when a result of the channel listening is that the channel is idle, and if the result of the channel listening is that the channel is busy, the communication device cannot perform signal transmission on the corresponding channel. In addition, in order to ensure fairness, a communication device is configured with Maximum Channel Occupancy Time (MCOT). In one signal transmission, a time length of signal transmission performed by the communication device using a channel of an unlicensed spectrum cannot exceed corresponding MCOT.

Figure 1:
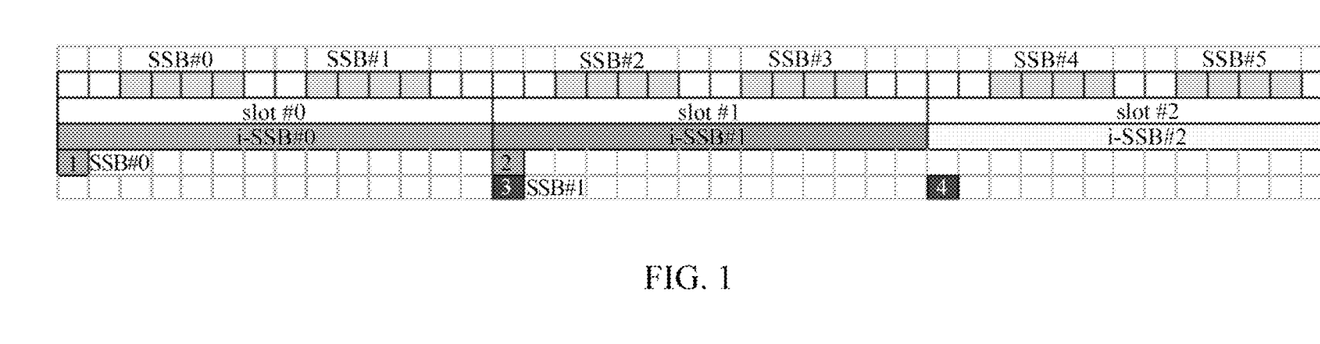
FIG. 1 is a schematic diagram of detecting a Type0-PDCCH in the related art.

In 5G NR technologies, for an unlicensed spectrum, according to the meeting conclusion of RAN1#97, a relative position of a Synchronization Signal block (SSB) in a slot and a blind detection position (i.e. a detection opportunity) of a Type0-PDCCH by a User Equipment are consistent with relevant definitions in the NR R15 standard. Referring to FIG. 1, a UE has detected two SSB indexes of SSB#0 and SSB#1 respectively. According to the R15 protocol, after detecting an SSB index, the UE needs to perform blind detection of a Type0-PDCCH in two consecutive slots. That is, as shown in FIG. 1, when the UE detects SSB#0, it needs to perform the blind detection of the Type0-PDCCH at position 1 of slot#0 in the figure and position 2 of slot#1 in the figure. When the UE detects SSB#1, it needs to perform the blind detection of the Type0-PDCCH at position 3 of slot#1 in the figure and position 4 of slot#2 in the figure. In addition, in the New Radio Unlicensed (NRU) discussion, a UE not only needs to perform blind detection of a Type0-PDCCH in two consecutive slots corresponding to a detected SSB index, but also needs to perform blind detection of the Type0-PDCCH in two consecutive slots corresponding to another SSB index with a Quasi Co-Location (QCL) relationship with the SSB index, which leads to too many times of blind detection of the Type0-PDCCH by the UE and increases energy consumption of the UE.

Based on this, in various implementations of the present disclosure, a terminal determines a slot of a detection opportunity of a Type0-PDCCH according to a Sub-Carrier Space (SCS), a window length of a Discovery Reference Signal (DRS), and an indication value of a QCL relationship between different SSB indexes, which effectively reduces a quantity of times for detecting the Type0-PDCCH by the terminal and saves energy consumption of the terminal.

Figure 2:
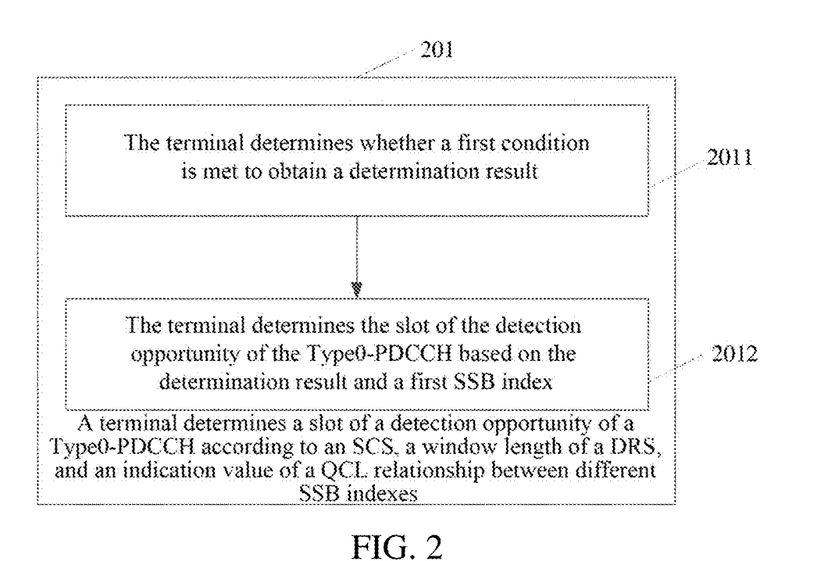
FIG. 2 is a schematic flowchart of an implementation of a method for determining a slot of a detection opportunity according to an implementation of the present disclosure.

The present disclosure provides a method for determining a detection opportunity, which is applied to a terminal. As shown in FIG. 2, a method for determining a detection opportunity according to an implementation of the present disclosure includes act 201 in FIG. 2.

In act 201, a terminal determines a slot of a detection opportunity of a Type0-Physical Downlink Control Channel (Type0-PDCCH) according to a Sub-Carrier Space (SCS), a window length of a Discovery Reference Signal (DRS), and an indication value of a Quasi Co-Location (QCL) relationship between different SSB indexes.

Here, a terminal determines a detection opportunity of a corresponding Type0-PDCCH when the terminal detects an SSB index, according to an SCS, a window length L of a DRS, and an indication value Q of a QCL relationship between different SSB indexes.

Here, the indication value Q is an indication of the QCL relationship between different SSB indexes. For example, for two SSB indexes SSB#i and SSB#j, if (i+j) mod Q=i, then there is a QCL relationship between indexes SSB#i and SSB#j, that is, there is a QCL relationship between an SSB candidate position corresponding to index SSB#i and an SSB candidate position corresponding to SSB#j. If (i+j) mod Q=i does not hold, there is no QCL relationship between index SSB#i and SSB#j, that is, there is no QCL relationship between an SSB candidate position corresponding to index SSB#i and an SSB candidate position corresponding to SSB#j.

Among them, the SCS may be a default SCS, that is, the SCS is a default value; or, the SCS is acquired by the terminal through a Radio Resource Control (RRC) instruction, here a base station sends an SCS through an RRC instruction and the terminal acquires the SCS through the RRC instruction.

In a practical application, an SCS is 30 kHz or 15 kHz.

In an implementation, as shown in FIG. 2, the terminal determines the slot of the detection opportunity of the Type0-PDCCH according to the SCS, the window length of the DRS, and the indication value of the QCL relationship between different SSB indexes, including acts 2011 and 2022.

In act 2011, the terminal determines whether a first condition is met to obtain a determination result; wherein the first condition is that a quantity of SSB candidate positions within a DRS window is less than the indication value, and the quantity of SSB candidate positions within the DRS window is determined based on the SCS and the window length.

The first condition is that the quantity of SSB candidate positions within the DRS window is less than the indication value Q. In a case that an SCS is 30 kHz, there are four SSB candidate positions in a DRS window with a window length L of 1 ms. In a case that an SCS is 15 kHz, there are two SSB candidate positions in a DRS window with a window length L of 1 ms. Therefore, a quantity of SSB candidate positions in a DRS window may be determined based on an SCS and a window length of a DRS, so as to further determine whether the quantity of SSB candidate positions within the DRS window is less than an indication value Q. For example, if an SCS is 30 kHz, a window length L of a DRS is 5 ms, and an indication value Q is 4, then a quantity of SSB candidate positions in a DRS window is calculated by 4*L, that is, the quantity of SSB candidate positions within the DRS window is 20, which is greater than the indication value Q. For another example, if an SCS is 15 kHz, a window length L of a DRS is 10 ms, and an indication value Q is 4, then a quantity of SSB candidate positions in a DRS window is calculated by 2*L, that is, the quantity of SSB candidate positions within the DRS window is 10, which is greater than the indication value Q.

Here, in a case that the quantity of SSB candidate positions within the DRS window is less than the indication value Q, a determination result that the first condition is met is obtained; in a case that the quantity of SSB candidate positions within the DRS window is not less than the indication value Q, a determination result that the first condition is not met is obtained.

In act 2012, the terminal determines the slot of the detection opportunity of the Type0-PDCCH based on the determination result and a first SSB index; wherein the first SSB index is an SSB index detected by the terminal.

In an implementation, in a case that the determination result is that the first condition is met, the terminal uses two consecutive slots from a slot corresponding to the first SSB index as slots of detection opportunities of the Type0-PDCCH.

That is to say, in a case that a quantity of SSB candidate positions in a DRS window is less than an indication value Q, detection of the Type0-PDCCH needs to be performed in two consecutive slots starting from the slot corresponding to the SSB index detected by the terminal, that is, detection of the Type0-PDCCH is performed in both the slot corresponding to the SSB index detected by the terminal and a next slot of that slot.

In an implementation, in a case that the determination result is that the first condition is not met, the terminal determines at least one second SSB index having a QCL relationship with the first SSB index, and determines the slot of the detection opportunity of the Type0-PDCCH according to the first SSB index and the at least one second SSB index.

Here, the second SSB index is an SSB index having a QCL relationship with the first SSB index detected by the terminal, and the terminal determines the slot of the detection opportunity of the Type0-PDCCH according to the detected first SSB index and at least one second SSB index having a QCL relationship with the first SSB index. For example, an SCS is 15 kHz, as shown above, there are 10 SSB candidate positions in a DRS window with a window length L of 5 ms. If an SSB index detected by a terminal in the DRS window is SSB#i (i=0), among the 10 SSB candidate positions, according to (i+j) mod Q=i, an SSB index that has a QCL relationship with SSB#0 is SSB#j (including SSB#4 and SSB#8), then the terminal determines a slot for a detection opportunity of a Type0-PDCCH according to SSB#0, SSB#4, and SSB#8.

In an implementation, determining the slot of the detection opportunity of the Type0-PDCCH according to the first SSB index and the at least one second SSB index includes: the terminal uses two consecutive slots from a slot corresponding to the first SSB index and two consecutive slots from a slot corresponding to each second SSB index in the at least one second SSB index as slots of detection opportunities of the Type0-PDCCH.

Here, it may be understood that for the first SSB index and each second SSB index, the terminal needs to start from a slot corresponding to each SSB index and detect the Type0-PDCCH in two consecutive slots. For example, in the above example, a first SSB index is SSB#0 and second SSB indexes are SSB#4 and SSB#8, a terminal needs to detect a Type0-PDCCH in two consecutive slots for SSB#0, SSB#4, and SSB#8, and detect the Type0-PDCCH in slots of six Type0-PDCCH detection opportunities in total.

In an implementation, determining the slot of the detection opportunity of the Type0-PDCCH according to the first SSB index and the at least one second SSB index includes: the terminal uses a slot corresponding to the first SSB index and a slot corresponding to each second SSB index in the at least one second SSB index as slots of detection opportunities of the Type0-PDCCH.

Here, it may be understood that for a first SSB index and each second SSB index, a terminal needs to detect a Type0-PDCCH in a slot corresponding to each SSB index. For example, in the above example, wherein a first SSB index is SSB#0 and second SSB indexes are SSB#4 and SSB#8, a terminal needs to detect a Type0-PDCCH in slots corresponding to SSB#0, SSB#4, and SSB#8 respectively, and detect the Type0-PDCCH in slots of three detection opportunities in total. It may be understood that compared with the previous implementation, a quantity of times for detecting the Type0-PDCCH by the terminal is reduced here, and energy consumption of the terminal is effectively reduced.

In an implementation, determining the slot of the detection opportunity of the Type0-PDCCH according to the first SSB index and the at least one second SSB index includes: the terminal determines at least one third SSB index in the at least one second SSB index; an SSB candidate position corresponding to the third SSB index is located within Channel Occupancy Time (COT); the COT is COT established by a base station; the terminal uses two consecutive slots from a slot corresponding to the first SSB index and two consecutive slots from a slot corresponding to each third SSB index in the at least one third SSB index as slots of detection opportunities of the Type0-PDCCH.

Here, the terminal may obtain information about COT, which is established by the base station and is used for indicating Channel Occupation Time allowed by the terminal in each signal transmission. In combination with COT, the terminal further determines at least one third SSB index in at least one second SSB index which has a QCL relationship with a first SSB index. For the first SSB index and each determined third SSB index, the terminal needs to detect a Type0-PDCCH in two consecutive slots starting from a slot corresponding to each SSB index. For example, in the above example where a first SSB index is SSB#0 and second SSB indexes are SSB#4 and SSB#8, the terminal continues to determine whether SSB candidate positions corresponding to these three SSB indexes are all within COT. If they are all within the COT, the terminal needs to detect a Type0-PDCCH for SSB#0, SSB#4, and SSB#8 in two consecutive slots, that is, the Type0-PDCCH is detected for 6 times in total. If an SSB candidate position corresponding to SSB#8 is not within the COT, and SSB candidate positions corresponding to SSB#0 and SSB#4 are within the COT, the terminal needs to detect the Type0-PDCCH in two consecutive slots for SSB#0 and SSB#4, that is, the Type0-PDCCH is detected in slots of four Type0-PDCCH detection opportunities in total.

Here, compared with the above implementations, a quantity of second SSB indexes is further limited through COT, and when there is an SSB candidate position corresponding to a second SSB index that is not within the COT, a quantity of times for detecting a Type0-PDCCH by the terminal may be further reduced, and energy consumption of the terminal may be reduced.

In an implementation, determining the slot of the detection opportunity of the Type0-PDCCH according to the first SSB index and the at least one second SSB index includes: the terminal determines at least one third SSB index in the at least one second SSB index; an SSB candidate position corresponding to the third SSB index is located within Channel Occupancy Time (COT); the COT is COT established by a base station; the terminal uses a slot corresponding to the first SSB index and a slot corresponding to each third SSB index in the at least one third SSB index as slots of detection opportunities of the Type0-PDCCH.

Here, for the first SSB index and each determined third SSB index, the terminal needs to detect the Type0-PDCCH in a slot corresponding to each SSB index. For example, in the above example where a first SSB index is SSB#0 and second SSB indexes are SSB#4 and SSB#8, a terminal continues to determine whether SSB candidate positions corresponding to these three SSB indexes are all within COT. If they are all within the COT, the terminal needs to detect a Type0-PDCCH in slots corresponding to SSB#0, SSB#4, and SSB#8 respectively, that is, the Type0-PDCCH is detected in slots of three detection opportunities in total. If an SSB candidate position corresponding to SSB#8 is not within the COT, and SSB candidate positions corresponding to SSB#0 and SSB#4 are within the COT, the terminal needs to detect the Type0-PDCCH in slots corresponding to SSB#0 and SSB#4 respectively, that is, the Type0-PDCCH is detected in slots of two detection opportunities in total.

Here, compared with the previous implementation, in a case that a quantity of second SSB indexes is further limited through COT, for both a first SSB index and a determined third SSB index, detection of a Type0-PDCCH is only performed once, which further reduces a quantity of times for detecting the Type0-PDCCH by the terminal and reduces energy consumption of the terminal.

In an implementation, the method further includes: the terminal acquires a first indication; the window length is indicated in the first indication; or, the terminal determines the window length to be a first default value in a case that the first indication is not acquired.

Here, the terminal may determine a value of a window length L through a window length of a DRS indicated in the first indication. In addition, in a case that the terminal does not acquire the first indication, the terminal determines a default value of the window length of the DRS as the value of the window length L. For example, if the default value of the window length of DRS is 5 ms, 5 ms is determined as the value of the window length L.

In a practical application, the window length L of the DRS includes any one of following: 1 ms; 2 ms; 3 ms; 4 ms; and 5 ms.

In an implementation, the method further includes: the terminal acquires a second indication; the indication value is indicated in the second indication; or, the terminal determines the indication value to be a second default value in a case that the second indication is not acquired.

Here, the terminal may determine a value of an indication value Q through an indication value of a QCL relationship between different SSB indexes indicated in the second indication. In addition, in a case that the terminal does not acquire the second indication, the terminal determines the second default value as the value of the indication value Q. For example, if the second default value is 8, 8 is determined as the value of the indication value Q.

In a practical application, the value of Q includes any one of following: 1; 2; 4; and 8.

In an implementation, the method further includes: the terminal acquires a third indication; the COT is indicated in the third indication; or, the terminal determines the COT to be a third default value in a case that the third indication is not acquired.

Here, in a case that the terminal does not acquire the third indication, the terminal determines the third default value as a value of the COT. In a practical application, a third default value may be automatically set to a value greater than a window length L of a DRS, so that an SSB candidate position corresponding to a first SSB index detected by the terminal and candidate positions corresponding to all second SSB indexes having a QCL relationship with the first SSB index are all located within COT; or, the set third default value may enable the SSB candidate position corresponding to the first SSB index only detected by the terminal to be located within the COT.

In an implementation, the method further includes: the terminal acquires a fourth indication; the SCS is indicated in the fourth indication; or, the terminal determines the SCS to be a fourth default value in a case that the fourth indication is not acquired.

Here, the terminal may determine a value of an SCS through an SCS indicated in the fourth indication. In addition, in a case that the terminal does not acquire the fourth indication, the terminal determines the fourth default value as the value of the SCS, for example, a default SCS is 15 kHz.

According to the method and apparatus for determining a slot of a detection opportunity, the terminal, and the storage medium provided by the implementations of the present disclosure, the terminal determines the slot of the detection opportunity of a Type0-PDCCH according to an SCS, a window length of a DRS, and an indication value of a QCL relationship between different SSB indexes, so that a quantity of times for detecting the Type0-PDCCH by the terminal can be effectively reduced, and energy consumption of the terminal can be effectively reduced.

It should be noted that, based on the method for determining a slot of a detection opportunity according to an implementation of the present disclosure, after detecting an SSB candidate position and a corresponding SSB index, the terminal searches for a corresponding frame index and a slot index according to the R15 protocol, in which it is stipulated that the frame index needs to satisfy a following equation.

$$[(O \cdot 2^\mu + \lfloor j \cdot M \rfloor)/N_{slot}^{frame,\mu}] \bmod 2 = 0$$

The slot index needs to satisfy a following equation.

$$n_0 = (O \cdot 2^\mu + \lfloor j \cdot M \rfloor)/N_{slot}^{frame,\mu}$$

Among them, j is an SSB index of a Type0-PDCCH detection opportunity determined by the terminal.

The method for determining a slot of a detection opportunity according to an implementation of the present disclosure will be further explained below in combination with application examples.

First Application Example

A base station is configured with following information: an SCS is 15 kHz, a window length of a DRS is L=5 ms, and an indication value Q is 4. In a case that a UE does not get any COT information, the UE determines that L*2=10 is greater than Q=4, and the UE may determine that there are 10 SSB candidate positions in this configured DRS window: SSB#0, . . . , and SSB#9. In this DRS window, the UE detects that an SSB index is SSB#0, then the UE determines that SSB indexes of detection opportunities of a Type0-PDCCH is SSB#0 and another SSB index having a QCL relationship with SSB#0, that is, according to (i+j) mod Q=i, in the above 10 SSB candidate positions, SSB indexes having a QCL relationship with SSB#0 are determined to be SSB#4 and SSB#8, then, the UE searches for a corresponding frame index and slot index based on the above equation, wherein j=0, 4, and 8. Here, the UE does not need to detect the Type0-PDCCH in two consecutive slots starting from slots corresponding to SSB#0, SSB#4, and SSB#8 respectively, which reduces complexity and power consumption of the UE.

Second Application Example

A base station is configured with following information: an SCS is 15 kHz, a window length of a DRS is L=5 ms, and an indication value Q is 4. COT information obtained by a UE indicates that an end point of COT is within a DRS window. At this time, the UE determines that L*2=10 is greater than Q=4, and the UE may determine that there are 10 SSB candidate positions in this configured DRS window: SSB#0, . . . , and SSB#9. In this DRS window, the UE detects that an SSB index is SSB#0, then the UE determines that SSB indexes of detection opportunities of a Type0-PDCCH is SSB#0 and another SSB index having a QCL relationship with SSB#0, that is, according to (i+j) mod Q=i, in the above 10 SSB candidate positions, SSB indexes having a QCL relationship with SSB#0 are determined to be SSB#4 and SSB#8. If SSB candidate positions corresponding to SSB#0, SSB#4, and SSB#8 are all located in the COT, the UE searches for a corresponding frame index and slot index based on the above equation, wherein j=0, 4, and 8. If candidate positions corresponding to SSB#0 and SSB#4 are located in the COT, and a candidate position corresponding to SSB#8 is not located in the COT, then SSB indexes of detection opportunities of the Type0-PDCCH are SSB#0 and SSB#4, and the UE searches for a corresponding frame index and slot index based on the above equation, wherein j=0 and 4. Here, the UE does not need to detect the Type0-PDCCH in two consecutive slots starting from slots corresponding to SSB#0 and SSB#4 respectively, which reduces complexity and power consumption of the UE.

Third Application Example

A base station is configured with following information: an SCS is 15 kHz, a window length of a DRS is L=2 ms, and an indication value Q is 8. In a case that a UE does not get any COT information, the UE determines that L*2=4 is less than Q=8, and the UE may determine that there are 4 SSB candidate positions in this configured DRS window: SSB#0, . . . , and SSB#3. In this DRS window, the UE detects that an SSB index is SSB#0. Here, there is no QCL relationship between multiple SSB indexes. The UE determines that an SSB index of a detection opportunity of a Type0-PDCCH is SSB#0, and then the UE searches for a corresponding frame index and slot index based on the above equation, wherein j=0. Here, the UE needs to detect the Type0-PDCCH in two consecutive slots starting from a slot corresponding to SSB#0.

Figure 3:
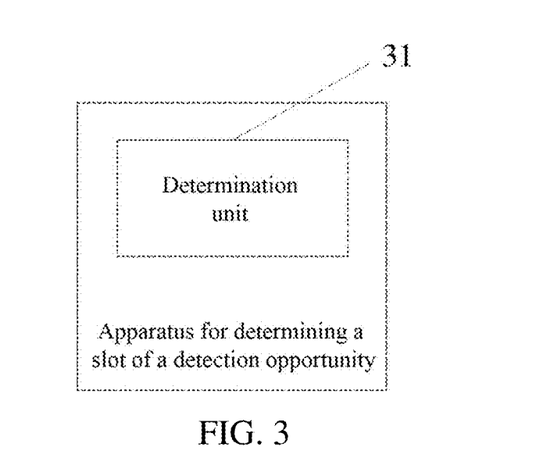
FIG. 3 is a schematic diagram of a structure of an apparatus for determining a slot of a detection opportunity according to an implementation of the present disclosure.

In order to implement the method for determining a slot of a detection opportunity in an implementation of the present disclosure, an implementation of the present disclosure also provides an apparatus for determining a slot of a detection opportunity, which may be set in a terminal. FIG. 3 is a schematic diagram of a composition structure of an apparatus for determining a slot of a detection opportunity according to an implementation of the present disclosure. As shown in FIG. 3, the apparatus for determining the slot of the detection opportunity includes: a determination unit 31, configured to determine a slot of a detection opportunity of a Type0-PDCCH according to an SCS, a window length of a DRS, and an indication value of a QCL relationship between different SSB indexes.

In an implementation, the determination unit 31 is configured to: determine whether a first condition is met to obtain a determination result, wherein the first condition is that a quantity of SSB candidate positions within a DRS window is less than the indication value, and the quantity of SSB candidate positions within the DRS window is determined based on the SCS and the window length; and determine a slot of a detection opportunity of a Type0-PDCCH based on the determination result and a first SSB index, wherein the first SSB index is an SSB index detected by the terminal.

In an implementation, when the determination unit 31 determines the slot of the detection opportunity of the Type0-PDCCH based on the determination result and the first SSB index, the determination unit 31 is configured to: use two consecutive slots from a slot corresponding to the first SSB index as slots of detection opportunities of the Type0-PDCCH in a case that the determination result is that the first condition is met; or, determine at least one second SSB index having a QCL relationship with the first SSB index and determine the slot of the detection opportunity of the Type0-PDCCH according to the first SSB index and the at least one second SSB index in a case that the determination result is that the first condition is not met.

In an implementation, when the determination unit 31 determines the slot of the detection opportunity of the Type0-PDCCH according to the first SSB index and the at least one second SSB index, the determination unit 31 is configured to: use two consecutive slots from a slot corresponding to the first SSB index and two consecutive slots from a slot corresponding to each second SSB index in the at least one second SSB index as slots of detection opportunities of the Type0-PDCCH.

In an implementation, when the determination unit 31 determines the slot of the detection opportunity of the Type0-PDCCH according to the first SSB index and the at least one second SSB index, the determination unit 31 is configured to: use a slot corresponding to the first SSB index and a slot corresponding to each second SSB index in the at least one second SSB index as slots of detection opportunities of the Type0-PDCCH.

In an implementation, when the determination unit 31 determines the slot of the detection opportunity of the Type0-PDCCH according to the first SSB index and the at least one second SSB index, the determination unit 31 is configured to: determine at least one third SSB index in the at least one second SSB index, wherein an SSB candidate position corresponding to the third SSB index is located within COT, the COT is COT established by a base station; use two consecutive slots from a slot corresponding to the first SSB index and two consecutive slots from a slot corresponding to each third SSB index in the at least one third SSB index as slots of detection opportunities of the Type0-PDCCH.

In an implementation, when the determination unit 31 determines the slot of the detection opportunity of the Type0-PDCCH according to the first SSB index and the at least one second SSB index, the determination unit 31 is configured to: determine at least one third SSB index in the at least one second SSB index, wherein an SSB candidate position corresponding to the third SSB index is located within COT, the COT is COT established by a base station; use a slot corresponding to the first SSB index and a slot corresponding to each third SSB index in the at least one third SSB index as slots of detection opportunities of the Type0-PDCCH.

In an implementation, the apparatus further includes: a first acquisition unit configured to acquire a first indication, wherein the window length is indicated in the first indication; or, the apparatus further includes: a first default value determination unit configured to determine the window length to be a first default value in a case that the first indication is not acquired.

In an implementation, the apparatus further includes: a second acquisition unit configured to acquire a second indication, wherein the indication value is indicated in the second indication; or, the apparatus further includes: a second default value determination unit configured to determine the indication value to be a second default value in a case that the second indication is not acquired.

In an implementation, the apparatus further includes: a third acquisition unit configured to acquire a third indication, wherein the COT is indicated in the third indication; or, the apparatus further includes: a third default value determination unit configured to determine the COT to be a third default value in a case that the third indication is not acquired.

In an implementation, in a case that the third indication is not acquired, the third default value is a value greater than the window length.

In an implementation, the apparatus further includes: a fourth acquisition unit configured to acquire a fourth indication, wherein the SCS is indicated in the fourth indication; or, the apparatus further includes: a fourth default value determination unit configured to determine the SCS to be a fourth default value in a case that the fourth indication is not acquired.

In an implementation, a value of the window length includes any one of following: 1 ms; 2 ms; 3 ms; 4 ms; and 5 ms.

In an implementation, a value of the indication value includes any one of following: 1; 2; 4; and 8.

In a practical application, the first acquisition unit, the second acquisition unit, the third acquisition unit, and the fourth acquisition unit may be implemented through a communication interface in the apparatus for determining a slot of a detection opportunity, and the determination unit 31, the first default value determination unit, the second default value determination unit, the third default value determination unit, and the fourth default value determination unit may be implemented through a processor in the apparatus for determining a slot of a detection opportunity, such as a Central Processing Unit (CPU), a Digital Signal Processor (DSP), a Microcontroller Unit (MCU), or a Field-Programmable Gate Array (FPGA).

It should be noted that division of the aforementioned various program modules is merely taken as an example for illustration when the apparatus for determining a slot of a detection opportunity according to the aforementioned implementation performs translation. In a practical application, the aforementioned processing may be allocated to and accomplished by different program modules as required, that is, an internal structure of a terminal may be divided into different program modules to accomplish all or part of the aforementioned processing. In addition, the apparatus for determining a slot of a detection opportunity according to the aforementioned implementation and the method implementation for determining a slot of a detection opportunity belong to a same concept, and a specific implementation process thereof refers to the method implementation in detail and will not be repeated here.

Figure 4:
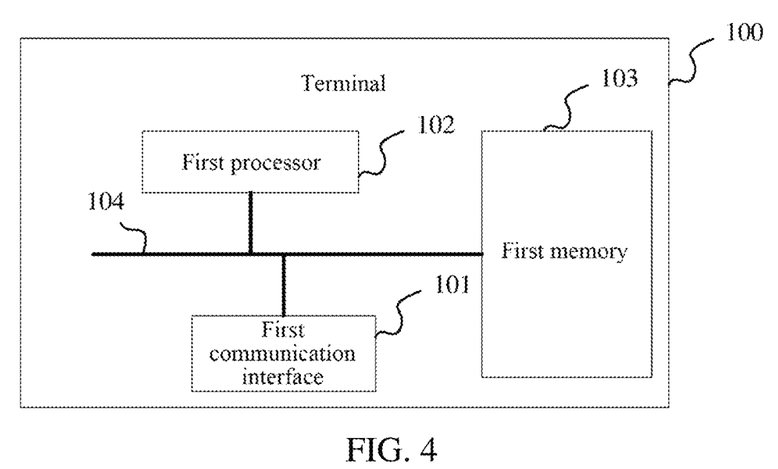
FIG. 4 is a schematic diagram of a structure of a terminal according to an implementation of the present disclosure.

Based on a hardware implementation of the aforementioned program modules, and in order to implement the method for determining a slot of a detection opportunity in an implementation of the present disclosure, an implementation of the present disclosure also provides a terminal, as shown in FIG. 4, the terminal 100 includes: a first communication interface 101 capable of performing information interaction with a network device; and a first processor 102, which is connected with the first communication interface 101 to implement information interaction with the network device, and is configured to perform the method provided in one or more of the above technical solutions when running a computer program. The computer program is stored in the first memory 103.

Specifically, the first processor 102 is configured to determine a slot of a detection opportunity of a Type0-PDCCH according to an SCS, a window length of a DRS, and an indication value of a QCL relationship between different SSB indexes.

In an implementation, when the first processor 102 determines the slot of the detection opportunity of the Type0-PDCCH according to the SCS, the window length of the DRS, and the indication value of the QCL relationship between different SSB indexes, the first processor 102 is configured to: determine whether a first condition is met to obtain a determination result, wherein the first condition is that a quantity of SSB candidate positions within a DRS window is less than the indication value, the quantity of SSB candidate positions within the DRS window is determined based on the SCS and the window length; determine a slot of a detection opportunity of a Type0-PDCCH based on the determination result and a first SSB index, wherein, the first SSB index is an SSB index detected by the terminal.

In an implementation, the first processor 102, when determining the slot of the detection opportunity of the Type0-PDCCH based on the determination result and the first SSB index, is configured to: use two consecutive slots from a slot corresponding to the first SSB index as slots of detection opportunities of the Type0-PDCCH in a case that the determination result is that the first condition is met; or, determine at least one second SSB index having a QCL relationship with the first SSB index and determines the slot of the detection opportunity of the Type0-PDCCH according to the first SSB index and the at least one second SSB index in a case that the determination result is that the first condition is not met.

In an implementation, the first processor 102, when determining the slot of the detection opportunity of the Type0-PDCCH according to the first SSB index and the at least one second SSB index, is configured to: use two consecutive slots from a slot corresponding to the first SSB index and two consecutive slots from a slot corresponding to each second SSB index in the at least one second SSB index as slots of detection opportunities of the Type0-PDCCH.

In an implementation, the first processor 102, when determining the slot of the detection opportunity of the Type0-PDCCH according to the first SSB index and the at least one second SSB index, is configured to: use a slot corresponding to the first SSB index and a slot corresponding to each second SSB index in the at least one second SSB index as slots of detection opportunities of the Type0-PDCCH.

In an implementation, the first processor 102, when determining the slot of the detection opportunity of the Type0-PDCCH according to the first SSB index and the at least one second SSB index, is configured to: determine at least one third SSB index in the at least one second SSB index, wherein an SSB candidate position corresponding to the third SSB index is located within Channel Occupancy Time (COT), the COT is COT established by a base station; use two consecutive slots from a slot corresponding to the first SSB index and two consecutive slots from a slot corresponding to each third SSB index in the at least one third SSB index as slots of detection opportunities of the Type0-PDCCH.

In an implementation, when the first processor 102 determines the slot of the detection opportunity of the Type0-PDCCH according to the first SSB index and the at least one second SSB index, the first processor 102 is configured to: determine at least one third SSB index in the at least one second SSB index, wherein an SSB candidate position corresponding to the third SSB index is located within COT, the COT is COT established by a base station; use a slot corresponding to the first SSB index and a slot corresponding to each third SSB index in the at least one third SSB index as slots of detection opportunities of the Type0-PDCCH.

In an implementation, the first communication interface 101 is configured to acquire a first indication, the window length is indicated in the first indication; or, the first processor 102 is configured to determine the window length to be a first default value in a case that the first indication is not acquired.

In an implementation, the first communication interface 101 is configured to acquire a second indication, the indication value is indicated in the second indication; or, the first processor 102 is configured to determine the indication value to be a second default value in a case that the second indication is not acquired.

In an implementation, the first communication interface 101 is configured to acquire a third indication, the COT is indicated in the third indication; or, the first processor 102 is configured to determine the COT to be a third default value in a case that the third indication is not acquired.

In an implementation, in a case that the terminal does not acquire the third indication, the third default value is a value greater than the window length.

In an implementation, the first communication interface 101 is configured to acquire a fourth indication, the SCS is indicated in the third indication; or, the first processor 102 is configured to determine the SCS to be a fourth default value in a case that the fourth indication is not acquired.

In an implementation, a value of the window length includes any one of following: 1 ms; 2 ms; 3 ms; 4 ms; and 5 ms.

In an implementation, a value of the indication value includes any one of following: 1; 2; 4; and 8.

It should be noted that specific processing procedures of the first processor 102 and the first communication interface 101 are illustrated in details in the method implementations, which will not be repeated here.

Of course, in a practical application, various components in the terminal 100 are coupled together through a bus system 104. It may be understood that the bus system 104 is used for implementing connection and communication between these components. In addition to a data bus, the bus system 104 further includes a power bus, a control bus, and a status signal bus. However, for clarity, all kinds of buses are uniformly referred to as a bus system 104 in FIG. 5.

The memory 103 in the implementations of the present disclosure is configured to store various types of data to support operations of the terminal 100. Examples of such data include any computer program for operating on the terminal 100.

Methods disclosed in above implementations of the present disclosure may be applied to the first processor 102 or implemented by the first processor 102. The first processor 102 may be an integrated circuit chip having a signal processing capability. In an implementation process, each of the acts of the above methods may be completed through an integrated logic circuit of hardware or instructions in a form of software in the first processor 102. The above first processor 102 may be a general purpose processor, a Digital Signal Processor (DSP), or another programmable logic device, a discrete gate or a transistor logic device, or a discrete hardware component, etc. The first processor 102 may implement or execute various methods, acts, and logical block diagrams disclosed in the implementations of the present disclosure. The general purpose processor may be a microprocessor or any conventional processor or the like. Acts of the methods disclosed in combination with the implementations of the present disclosure may be directly embodied as being executed and accomplished by a hardware decoding processor or by a combination of hardware and software modules in a decoding processor. The software modules may be located in a storage medium, and the storage medium is located in the first memory 103. The first processor 102 reads information in the first memory 103 and accomplishes the acts of the aforementioned methods in combination with hardware thereof.

In an exemplary implementation, the terminal 100 may be implemented by one or more Application Specific Integrated Circuits (ASICs), DSPs, Programmable Logic Devices (PLDs), Complex Programmable Logic Devices (CPLDs), Field-Programmable Gate Arrays (FPGAs), general-purpose processors, controllers, Micro Controller Units (MCUs), Microprocessors, or other electronic components, for executing the aforementioned methods.

It may be understood that the first memory 103 in the implementations of the present disclosure may be a volatile memory or a non-volatile memory, or may include both a volatile memory and a non-volatile memory. The non-volatile memory may be a Read Only Memory (ROM), a Programmable Read-Only Memory (PROM), an Erasable Programmable Read-Only Memory (EPROM), an Electrically Erasable Programmable Read-Only Memory (EEPROM), a ferromagnetic random access memory (FRAM), a Flash Memory, a magnetic surface memory, a compact disk, or a Compact Disc Read-Only Memory (CD-ROM). The magnetic surface memory may be a magnetic disk memory or a magnetic tape memory. The transitory memory may be a Random Access Memory (RAM) which serves as an external cache. By way of illustrative but not restrictive explanation, many forms of RAMs are available, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRS-DRAM), an Enhanced Synchronous Dynamic Random Access Memory (ESDRAM), a SyncLink Dynamic Random Access Memory (SLDRAM), a Direct Rambus Random Access Memory (DRRAM). A memory described in an implementation of the present disclosure is intended to include, but is not limited to, these and any other suitable types of memories.

In an exemplary implementation, an implementation of the present disclosure also provides a storage medium, that is, a computer storage medium, specifically a computer-readable storage medium, for example, including a first memory 103 for storing a computer program, which may be executed by the first processor 102 of the terminal 100 to complete the acts of the aforementioned terminal side method. The computer-readable storage medium may be a memory such as a FRAM, a ROM, a PROM, an EPROM, an EEPROM, a Flash Memory, a magnetic surface memory, an optical disk, or a CD-ROM.

It should be noted that "first", "second" and so on are used for distinguishing similar objects, but are not necessarily used for describing a specific order or sequence.

The technical solutions described in the implementations of the present disclosure may be combined arbitrarily in a case that there is no conflict.

The foregoing are merely specific implementations of the present disclosure, but the protection scope of the present disclosure is not limited thereto. Any variation or substitution that may easily occur to a person skilled in the art within the technical scope disclosed by the present disclosure shall be included within the protection scope of the present disclosure.

The invention claimed is:

1. A method for determining a slot of a detection opportunity, comprising:
   determining, by a terminal, a slot of a detection opportunity of a Type0-Physical Downlink Control Channel (Type0-PDCCH) according to a Sub-Carrier Space (SCS), a window length of a Discovery Reference Signal (DRS), and an indication value of a Quasi-Co-Location (QCL) relationship between different Synchronization Signal Block/Physical Broadcast Channel (PBCH) block indexes;
   wherein determining, by the terminal, the slot of the detection opportunity of the Type0-PDCCH according to the SCS, the window length of the DRS, and the indication value of the QCL relationship between different SSB indexes, comprises:
   determining, by the terminal, whether a first condition is met to obtain a determination result, wherein the first condition is that a quantity of SSB candidate positions within a DRS window is less than the indication value, and the quantity of SSB candidate positions within the DRS window is determined based on the SCS and the window length;
   determining, by the terminal, the slot of the detection opportunity of the Type0-PDCCH based on the determination result and a first SSB index, wherein, the first SSB index is an SSB index detected by the terminal.

2. The method of claim 1, wherein determining, by the terminal, the slot of the detection opportunity of the Type0-PDCCH based on the determination result and the first SSB index, comprises:
   using, by the terminal, two consecutive slots from a slot corresponding to the first SSB index as slots of detection opportunities of the Type0-PDCCH in a case that the determination result is that the first condition is met; or,
   determining, by the terminal, at least one second SSB index having a QCL relationship with the first SSB index and determining the slot of the detection opportunity of the Type0-PDCCH according to the first SSB index and the at least one second SSB index in a case that the determination result is that the first condition is not met.

3. The method of claim 2, wherein determining the slot of the detection opportunity of the Type0-PDCCH according to the first SSB index and the at least one second SSB index, comprises:
   using, by the terminal, two consecutive slots from a slot corresponding to the first SSB index and two consecutive slots from a slot corresponding to each second SSB index in the at least one second SSB index as slots of detection opportunities of the Type0-PDCCH.

4. The method of claim 2, wherein determining the slot of the detection opportunity of the Type0-PDCCH according to the first SSB index and the at least one second SSB index, comprises:
   using, by the terminal, a slot corresponding to the first SSB index and a slot corresponding to each second SSB index in the at least one second SSB index as slots of detection opportunities of the Type0-PDCCH.

5. The method of claim 2, wherein determining the slot of the detection opportunity of the Type0-PDCCH according to the first SSB index and the at least one second SSB index, comprises:
   determining, by the terminal, at least one third SSB index in the at least one second SSB index, wherein an SSB candidate position corresponding to the third SSB index is located within Channel Occupancy Time (COT), the COT is COT established by a base station;
   using, by the terminal, two consecutive slots from a slot corresponding to the first SSB index and two consecutive slots from a slot corresponding to each third SSB index in the at least one third SSB index as slots of detection opportunities of the Type0-PDCCH.

6. The method of claim 2, wherein determining the slot of the detection opportunity of the Type0-PDCCH according to the first SSB index and the at least one second SSB index, comprises:
   determining, by the terminal, at least one third SSB index in the at least one second SSB index, wherein an SSB candidate position corresponding to the third SSB index is located within Channel Occupancy Time (COT), the COT is COT established by a base station;
   using, by the terminal, a slot corresponding to the first SSB index and a slot corresponding to each third SSB index in the at least one third SSB index as slots of detection opportunities of the Type0-PDCCH.

7. The method of claim 1, further comprising:
   acquiring, by the terminal, a first indication, wherein the window length is indicated in the first indication; or, determining, by the terminal, the window length to be a first default value in a case that the first indication is not acquired.

8. The method of claim 7, further comprising:
acquiring, by the terminal, a second indication, wherein the indication value is indicated in the second indication; or,
determining, by the terminal, the indication value to be a second default value in a case that the second indication is not acquired.

9. The method of claim 8, further comprising:
acquiring, by the terminal, a third indication, wherein the COT is indicated in the third indication; or,
determining, by the terminal, the COT to be a third default value in a case that the third indication is not acquired, wherein the third default value is a value greater than the window length in a case that the terminal does not acquire the third indication.

10. The method of claim 9, further comprising:
acquiring, by the terminal, a fourth indication, wherein the SCS is indicated in the fourth indication; or,
determining, by the terminal, the SCS to be a fourth default value in a case that the fourth indication is not acquired.

11. The method of claim 1, wherein a value of the window length comprises at least one of following:
1 ms;
2 ms;
3 ms;
4 ms;
5 ms,
wherein a value of the indication value comprises at least one of following:
1;
2;
4;
8.

12. An apparatus for determining a slot of a detection opportunity, comprising: a first processor and a first memory configured to store a computer program that is runnable on a processor, wherein when the computer program is running, the first processor is configured to
determine a slot of a detection opportunity of a Type0-Physical Downlink Control Channel (Type0-PDCCH) according to a Sub-Carrier Space (SCS), a window length of a Discovery Reference Signal (DRS), and an indication value of a Quasi Co-Location (QCL) relationship between different Synchronization Signal block (SSB) indexes;
wherein the first processor is configured to:
determine whether a first condition is met to obtain a determination result, wherein the first condition is that a quantity of SSB candidate positions within a DRS window is less than the indication value, and the quantity of SSB candidate positions within the DRS window is determined based on the SCS and the window length; and
determine the slot of the detection opportunity of the Type0-PDCCH based on the determination result and a first SSB index, wherein, the first SSB index is an SSB index detected by the terminal.

13. The apparatus of claim 12, wherein when determining the slot of the detection opportunity of the Type0-PDCCH based on the determination result and the first SSB index, the first processor is configured to:
use two consecutive slots from a slot corresponding to the first SSB index as slots of detection opportunities of the Type0-PDCCH in a case that the determination result is that the first condition is met; or,
determine at least one second SSB index having a QCL relationship with the first SSB index and determine the slot of the detection opportunity of the Type0-PDCCH according to the first SSB index and the at least one second SSB index in a case that the determination result is that the first condition is not met.

14. The apparatus of claim 13, wherein when determining the slot of the detection opportunity of the Type0-PDCCH according to the first SSB index and the at least one second SSB index, the first processor is configured to:
use two consecutive slots from a slot corresponding to the first SSB index and two consecutive slots from a slot corresponding to each second SSB index in the at least one second SSB index as slots of detection opportunities of the Type0-PDCCH,
or,
use a slot corresponding to the first SSB index and a slot corresponding to each second SSB index in the at least one second SSB index as slots of detection opportunities of the Type0-PDCCH,
or,
determine at least one third SSB index in the at least one second SSB index, wherein an SSB candidate position corresponding to the third SSB index is located within Channel Occupancy Time (COT), the COT is COT established by a base station; and use two consecutive slots from a slot corresponding to the first SSB index and two consecutive slots from a slot corresponding to each third SSB index in the at least one third SSB index as slots of detection opportunities of the Type0-PDCCH,
or,
determine at least one third SSB index in the at least one second SSB index, wherein an SSB candidate position corresponding to the third SSB index is located within Channel Occupancy Time (COT), the COT is COT established by a base station; and use a slot corresponding to the first SSB index and a slot corresponding to each third SSB index in the at least one third SSB index as slots of detection opportunities of the Type0-PDCCH.

15. The apparatus of claim 12, the first processor is further configured to:
acquire a first indication, wherein the window length is indicated in the first indication; or, determine the window length to be a first default value in a case that the first indication is not acquired,
acquire a second indication, wherein the indication value is indicated in the second indication; or, determine the indication value to be a second default value in a case that the second indication is not acquired.

16. The apparatus of claim 15, the first processor is further configured to:
acquire a third indication, wherein the COT is indicated in the third indication; or,
determine the COT to be a third default value in a case that the third indication is not acquired,
wherein the third default value is a value greater than the window length in a case that the third indication is not acquired.

17. The apparatus of claim 16, the first processor is further configured to:
acquire a fourth indication, wherein the SCS is indicated in the fourth indication; or, determine the SCS to be a fourth default value in a case that the fourth indication is not acquired.

18. The apparatus of claim 12, wherein a value of the window length comprises at least one of following:
1 ms;
2 ms;
3 ms;
4 ms;
5 ms,
wherein a value of the indication value comprises at least one of following:
1;
2;
4;
8.

\* \* \* \* \*